United States Patent

[11] 3,632,866

[72] Inventor Michael C. King
    Basking Ridge, N.J.
[21] Appl. No. 868,342
[22] Filed Oct. 22, 1969
[45] Patented Jan. 4, 1972
[73] Assignee Bell Telephone Laboratories, Incorporated
    Murray Hill, N.J.

[54] THREE-DIMENSIONAL DISPLAY
    12 Claims, 3 Drawing Figs.
[52] U.S. Cl. .................................. 178/6.5
[51] Int. Cl. .................................. H04n 7/18,
                                                H04n 7/00
[50] Field of Search .......................... 178/6.5;
                                                350/161

[56] References Cited
    UNITED STATES PATENTS
    3,493,290  2/1970  Traub ................... 178/6.5

Primary Examiner—Robert L. Griffin
Assistant Examiner—Barry Leibowitz
Attorneys—R. J. Guenther and Arthur J. Torsiglieri ABSTRACT: A varifocal mirror is typically comprised of a thin aluminized Mylar film that is stretched over a loudspeaker driven sinusoidally at low frequencies. When an object is placed a short distance from the film and the film is oscillated, the position of the image of the object in the mirror will be constantly swept back and forth in the image space with an amplitude typically several times the mirror displacement. In the system herein described a first varifocal mirror is used to sweep a virtual image of a three-dimensional scene that is to be recorded through the first of a pair of conjugate planes of a large aperture, low f-number lens. Inasmuch as such a lens has a small depth of field, only one depth plane of the scene at a time will be in focus at the second, of the pair of conjugate planes of the lens. Thus, as the varifocal mirror oscillates, the images of a series of two-dimensional depth planes are projected onto a back projection screen placed at the second of the conjugate planes. These images can there be recorded for subsequent storage or transmission. At the other end of the system, the images are projected into an appropriate display screen and this screen is viewed through a second varifocal mirror vibrating at the same frequency as the first mirror but 180° out of phase. Consequently, this mirror forms a series of two-dimensional virtual images each located in the correct depth plane so as to recreate the original three-dimensional scene.

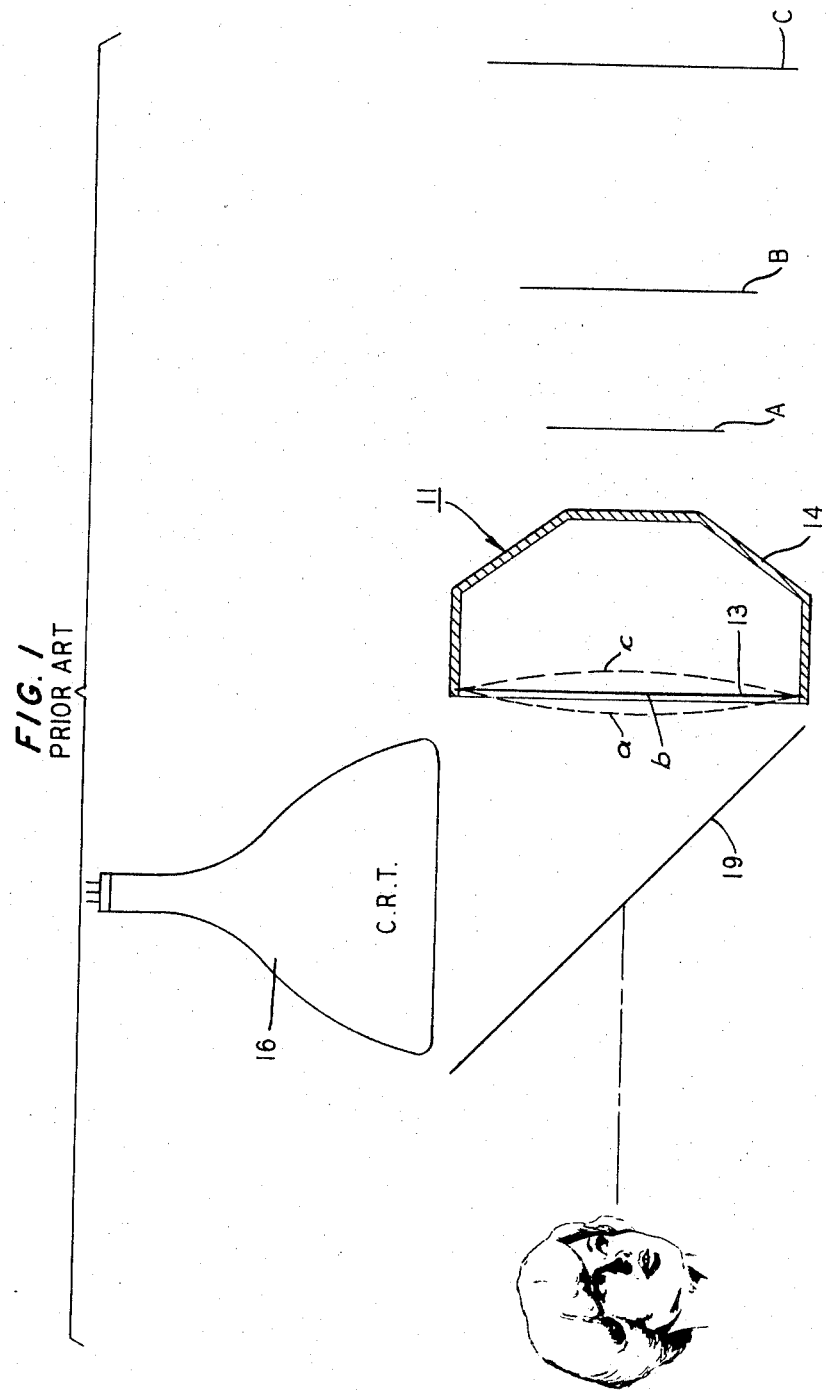

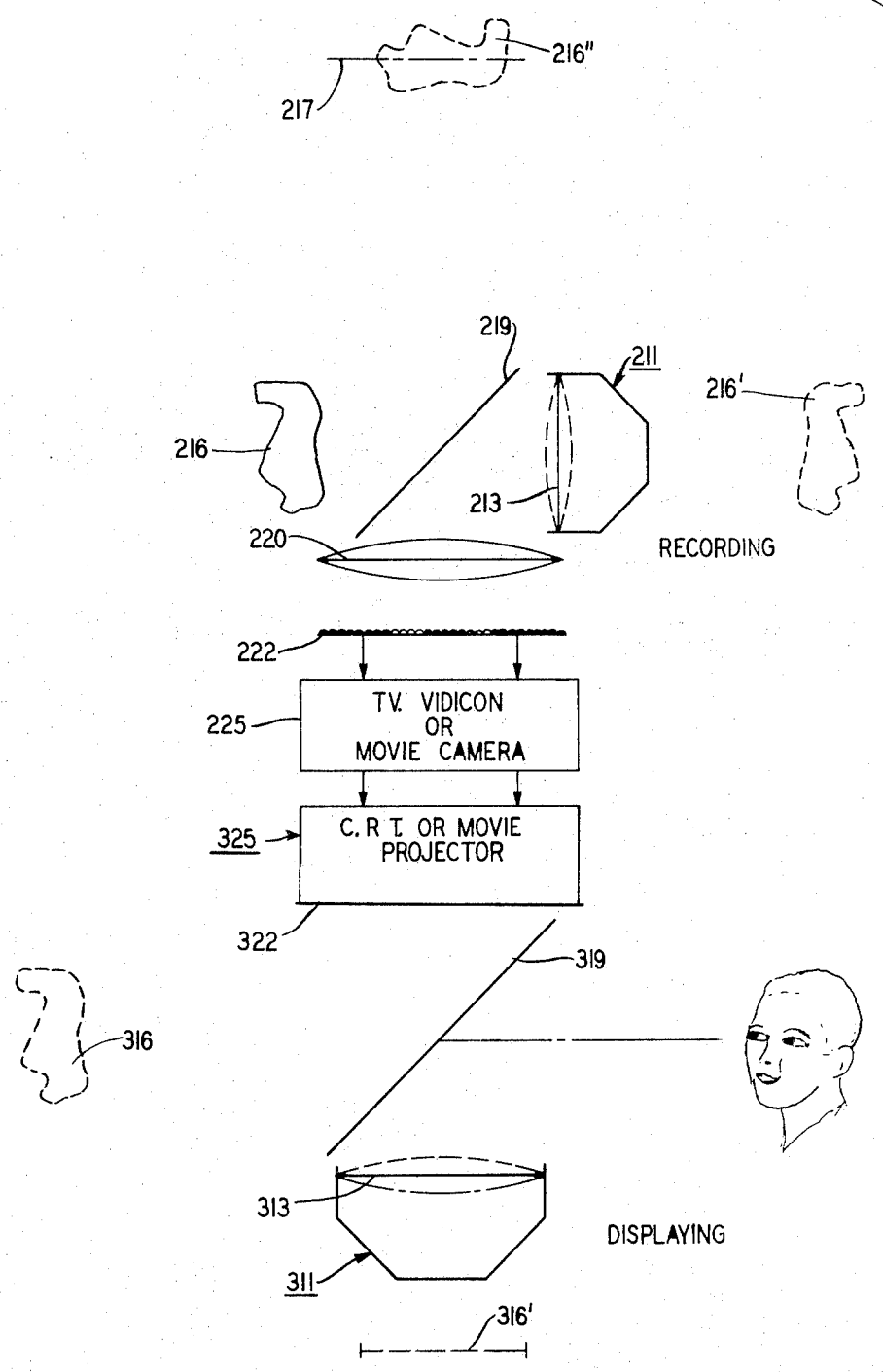

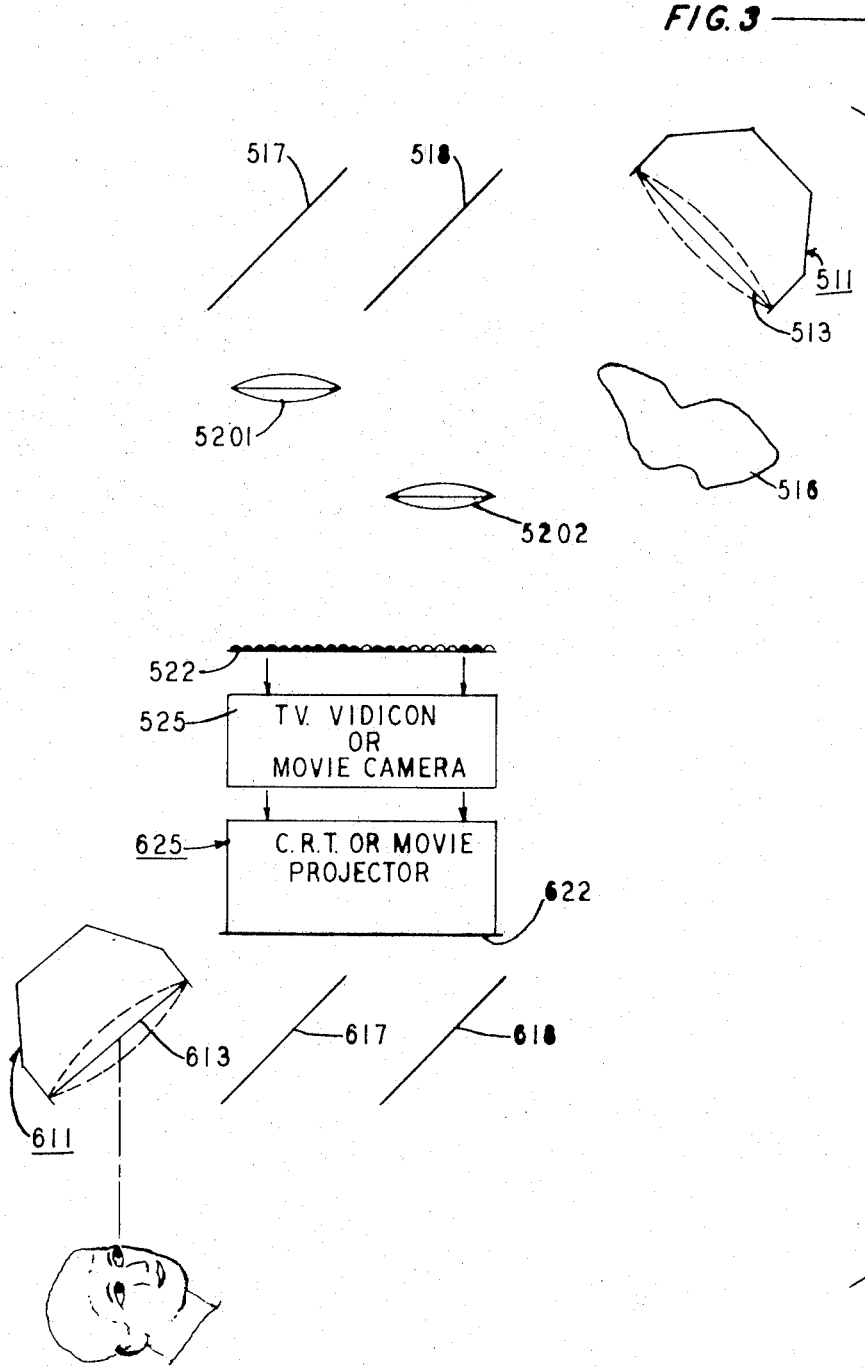

THREE-DIMENSIONAL DISPLAY

BACKGROUND OF THE INVENTION

This concerns three-dimensional display.

Three-dimensional display devices can be broadly characterized as either stereoscopic or autostereoscopic. In stereoscopic systems, pairs of ordinary two-dimensional photographs are made of an object at two points of view separated by a distance ordinarily equal to that between the eyes of a viewer. The pairs of photographs are then viewed in such a way that the right eye sees only the right photograph and the left eye sees only the left photograph. As a result, each eye sees a slightly different view, thereby duplicating the conditions under which the original scene would have been viewed; and consequently, the viewer is aware of only one view that has depth. Techniques for effecting such stereoscopic viewing include the familiar stereo pair separated by an opaque screen that permits only the right eye to see the right view and the left eye to see the left view and the method of viewing appropriate stereo pairs through polarized glasses the lenses of which are orientated to permit the viewing of only one photograph by a particular eye.

In autostereoscopic techniques it is not necessary for the viewer to wear glasses or use other auxiliary devices to keep the views separate. Moreover, what the viewer typically sees is not a pair of two-dimensional images as in the standard stereo pair, but rather an image or set of images that either appears to be distributed over three dimensions or in fact is distributed over three dimensions. Examples of the first type of autostereoscopic imaging devices are holograms and integral photographs. Less well known are devices and techniques of the second type which are reviewed in the summary, "Three-dimensional Disply," appearing in *Space/Aeronautics*, page 67 (Sept. 1962). These techniques include various methods of sweeping out a three-dimensional volume with a moving screen and displaying on the moving screen information representative of the scene at a particular point in space. They also include stationary three-dimensional arrays of wires or the like that can be made to produce light patterns by applying appropriate voltages to appropriate wires. Representative patents describing such volumetric display systems are T. M. Ferrill, Jr., U.S. Pat. No. 2,361,390; M. Hirsch, U.S. Pat. Nos. 2,967,905 and 2,979,561; R. J. Schipper et al. U.S. Pat. No. 3,097,261; F. A. Schwertz, U.S. Pat. No. 3,154,636; R. C. Bassett, U.S. Pat. No. 3,335,217 and C. S. Anderson, U.S. Pat. No. 3,371,155. Similar techniques have also been adapted for the three-dimensional display of radar and are described in such patents as J. L. Peters et al. U.S. Pat. No. 2,602,921J. L. Peters et al. U.S. Pat. No. 2,637,023; D. W. Adams, U.S. Pat. No. 3,023,408; E. L. Withey, U.S. Pat. No. 3,138,796; D. W. Perkins et al. U.S. Pat. No. 3,202,985; A. M. Skellett, U.S. Pat. No. 3,204,238; J. B. Garrison, U.S. Pat. No. 3,212,084; R. Sirkis, U.S. Pat. No. 3,300,779.

Of particular interest to this disclosure is a volumetric display device that was first proposed by J. C. Muirhead and has been developed extensively by A. C. Traub. This device, which is called a varifocal mirror, is comprised of a thin aluminized Mylar film stretched over a loudspeaker. When the speaker is driven at low enough frequencies, the film assumes the shape of a portion of the surface of a sphere of constantly changing radius. Consequently, when an object is placed a short distance from the vibrating film, the position of its image in the mirror will be constantly swept back and forth in the image space; and if the film oscillates fast enough, persistence of vision will cause the images to fuse. Moreover, when a cathode-ray tube (CRT) is placed a short distance from the vibrating film of the varifocal mirror and a series of light traces are displayed in rapid succession on the CRT, the images of these traces will be observed at different planes in the image space of the mirror. And when the mirror oscillates fast enough, persistence of vision will cause the images of the light traces to fuse. Consequently, if the images of the light traces represent the exterior of a three-dimensional object, a viewer will see in the varifocal mirror a three-dimensional image of the object.

Extensive discussion and description of this device as well as a derivation of the equations governing the image size and location may be found in the following papers: J. C. Muirhead, *Rev. Sci. Instrum.*, 32, 210 (1961), A. C. Traub, *Appl. Opt.*, 6, 1085 (June, 1967), E. G. Rawson, *Appl. Opt.*, 7, 1505 (Aug. 1968), E. G. Rawson, *IEEE Spectrum*, 6, 37 (Sept. 1969), and the book by A. C. Traub, *A New Three-dimensional Display Technique*, (Mitre Corporation, 1968).

Clearly, the varifocal mirror is one of the better volumetric display devices available, primarily because a small—and therefore mechanically simple—displacement of the Mylar film produces a substantial displacement of the image of an object in front of the film. However, the varifocal mirror has not been widely used to date because of the difficulty of generating information to be displayed by the mirror. Typically, displays have been limited either to objects laboriously drawn by hand or to objects plotted by a computer as described in the aforementioned *Spectrum* article by Rawson. And while the need for a real-time display of three-dimensional images has been recognized, for example, by A. C. Traub at pages 190 and 191 of his book, no method has been disclosed to date for effecting such a display.

SUMMARY OF THE INVENTION

Accordingly, it is an object of this invention to provide for the real-time display of three-dimensional images.

An it is a further object of this invention to provide for the real-time display of three-dimensional images by varifocal mirrors.

These and other objects of my invention are achieved by using one varifocal mirror in forming a record of the three-dimensional images to be displayed and by using a second varifocal mirror in displaying the three-dimensional image. The first varifocal mirror is used to form a virtual image of the three-dimensional scene to be recorded and to sweep this image through the first of a pair of conjugate planes of a large aperture, low *f*-number lens. Inasmuch as such a lens has a small depth of field, only one depth plane of the scene at a time will be in focus at the second of the pair of conjugate planes of the lens. Thus, as the first varifocal mirror sweeps back and forth, the images of a series of two-dimensional depth planes are projected onto a back projection screen placed at the second of the conjugate planes. These images can then be recorded by a high-speed movies camera or a television vidicon for subsequent storage or transmission.

At the other end of the system, these images are projected in their original order onto a movie screen or television monitor. The screen is then viewed through the second varifocal mirror vibrating at the same frequency as the first mirror but 180° out of phase. Consequently, this mirror forms a series of two-dimensional virtual images of the original scene each located in the proper depth plane with respect to the other images. Because the mirrors are driven at a high enough frequency for these two-dimensional images to be fused by the persistence of vision of the viewer, the original three-dimensional scene is thereby recreated in real time.

BRIEF DESCRIPTION OF THE DRAWING

These and other elements, features and objects of my invention will be more readily understood from the following detailed description of my invention taken in conjunction with the following drawing in which:

FIG. 1 shows a schematic illustration of a typical varifocal mirror of the prior art together with typical display apparatus;

FIG. 2 shows a schematic illustration of illustrative apparatus used to practice my invention; and FIG. 3 shows a schematic illustration of a second embodiment of my invention.

DETAILED DESCRIPTION OF THE DRAWING

Shown in FIG. 1 is typical varifocal display apparatus of the prior art. This system is comprised of a varifocal mirror 11, a cathode ray tube 16, and a beam-splitter 19. As indicated above, varifocal mirror 11 is comprised of a thin aluminized Mylar film 13 that is stretched over a loudspeaker 14. Operation of the loudspeaker at low-audio frequencies drives film 13 from its rest position indicated at $b$ to the poles indicated at $a$ and $c$. Because the frequencies applied to the varifocal mirror are typically only 15 to 60 Hz. and because the displacement, $\Delta$, between the rest position and either pole is small, the shape of the film when it is being driven is that of a portion of the surface of a sphere of constantly changing radius.

Cathode-ray tube 16 is used to form light traces that are reflected by the aluminized film 13 of the varifocal mirror and observed by the viewer situated as indicated in FIG. 1. A beam-splitter 19 is used to reflect the output of the CRT onto film 13 and to transmit the light reflected by film 13 to the eyes of the viewer.

As discussed in the *Applied Optics* paper of Rawson, the location of the image of the CRT display can be found by the spherical mirror equation $$1/S + S' = 2/r \quad (1)$$

where $S$ and $S'$ are the distances of the CRT display and its image, respectively, measured from the center of the displaced film and $r$ is the radius of curvature of the mirror. For convenience, it is customary to assume a fixed coordinate system with an origin at the center of the undisplaced film and to let all distances to the left of the origin be negative. If then the mirror pole displacement $\Delta$, is much smaller than either the object or image distance from the origin or the mirror diameter, which is the case for most uses of a varifocal mirror, then the distance of the image from the center of the undisplaced film in dimensionless units is given by $$\sigma' = -\frac{\sigma}{(1 + 4\sigma\delta)} \quad (2)$$

where $$\sigma' = \frac{S'_F}{R}, \quad \sigma = \frac{S_F}{R}, \quad \delta = \frac{\Delta}{R}$$

and $S_F'$ and $S_F$ are the distances of the image and the object measured from the origin and $R$ is one-half the diameter of the mirror.

And from the transverse magnification formula $m = S'/S$ for a spherical mirror, the transverse magnification of an image can be determined to be $$m = \frac{1}{1 + 4\sigma\delta} \quad (3)$$

Consideration of the equations specifying the image location and the magnification reveal that the image position is a nonlinear function of the distance the film is displaced from its rest position and that the magnification varies with the position of the film. These properties of the varifocal mirror are shown in the representations A, B and C of the images of the CRT display when film 13 is at positions $a$, $b$, and $c$, respectively. Note that the height of each image, which represents its magnification, is different and that the spacing between images varies. Compensation can be made for these effects by the methods detailed by Rawson in his *Applied Optics* paper; and as a result the viewer of the varifocal mirror is able to see an array of equal-sized images of the CRT display located at equally spaced depth planes in the image space of mirror 11.

Two such varifocal mirrors are used in the illustrative embodiment of my invention that is shown in FIG. 2. The system for recording information about a three-dimensional object 216 is comprised of a first varifocal mirror 211 having a reflecting surface comprised of a thin aluminized Mylar film 213, a beam-splitter 219, a low $f$-number lens 220, a back projection screen 222, and means 225 for recording whatever is displayed on screen 222. As indicated, such means might be a television vidicon or a movie camera. The system for displaying what is recorded by means 225 is comprised of image-forming means 325 for forming images on screen 322, a beam-splitter 319, and a second varifocal mirror 311 having a reflecting surface likewise comprised of a Mylar film 313.

As indicated in FIG. 2, the image of object 216 in Mylar film 213 is located behind varifocal mirror 211 and is represented by element 216'; and the image of image 216' in beam-splitter 219 is located behind the beam-splitter as indicated by element 216''. Similarly, the image of whatever is displayed on screen 322 is located behind Mylar film 313 and is represented by image 316'; and the image of image 316' as seen in beam-splitter 319 is located behind the beam-splitter and constitutes one of the planes in three-dimensional image 316. Of course, as explained in conjunction with FIG. 1, when the reflecting surface of a varifocal mirror is vibrated, the position of the image formed by the mirror is moved. Consequently, when film 213 is vibrated, image 216' and therefore image 216'' is swept back and forth through space; and similarly, when film 313 is vibrated, image 316' is swept through space.

Lens 220 has a large diameter and a small $f$-number so that it has a very short depth of field. It is used in the recording system to form on screen 222 substantially two-dimensional images of different planes of three-dimensional image 216' or 216'' of three-dimensional object 216. Consequently, the power of lens 220 and the position of the elements of the recording system are chosen so that when one of a pair of conjugate planes of lens 220 is coincident with screen 222 the other conjugate plane is located in space at a point through which the image of object 216 can be moved by operating varifocal mirror 211. This front conjugate plane, indicated as element 217, is shown located in the center of image 216'' for the case where reflecting film 213 of mirror 211 is in its undisplaced position. Obviously, when film 23 is displaced, the location of image 216'' with respect to plane 217 will change; and preferably the motion of film 213 will sweep all of image 216'' through plane 217 during one period of oscillation. (If desired, plane 217 could also be shown in the same position in image 216'.)

To practice my invention, a low-frequency signal, typically ranging between 15 and 60 Hz. is applied to varifocal mirror 211 to drive film 213 back and forth between the poles indicated by the dotted lines in FIG. 2. Object 216 is illuminated and some of the light from it passes through beam-splitter 219 to varifocal mirror 211 where it is reflected by the oscillating Mylar film 213. Some of the reflected light is reflected once more by beam-splitter 219 and is converged by lens 220 onto back projection screen 222. What is displayed on screen 222 is then recorded by recording means 225.

As indicated above, film 213 forms an image 216' of object 216 and beam-splitter 219 forms an image 216'' of image 216'. Moreover, because the shape of film 213 is that of a portion of a sphere of constantly changing radius, the location of image 216' and therefore of image 216'' is constantly being swept through space and, more particularly, through front conjugate plane 217 of lens 220. (Simultaneously, the magnification of image 216'' is constantly being changed, a point that will be discussed further below.) However, because lens 220 has very little depth of field, only that part of image 216'' that is near plane 217 is in focus at the rear conjugate plane of lens 220 that is coincident with back projection screen 222. And consequently, only the plane of image 216'' that is located near plane 217 is clearly displayed as a two-dimensional image on screen 222. However, over a period of time equal to the period of oscillation of film 213, each of the planes of images 216'' that is moved through focal plane 217 is displayed twice as a two-dimensional image on screen 222. And as many as possible of these two-dimensional images are recorded by conventional recording means 225. For example, if means 225 is an ordinary TV vidicon capable of recording 60 frames per second, 60 two-dimensional images of the planes of object 216 will be recorded.

This series of records of two-dimensional images of a three-dimensional object can the be used to form a three-dimensional image of the object. First, a driving signal is applied to varifocal mirror 311 to vibrate film 313 back and forth between the poles indicated by the dotted lines of FIG. 2. The two-dimensional images are then reconstructed from their records and projected one at a time from screen 322 of display means 325. To reconstruct the images in their proper order, the ratio of the frequency of image projection to the frequency of the driving signal applied to mirror 311 should be the same as the ratio of the frequency at which the images are recorded by means 225 to the frequency applied to mirror 211. In addition, the phase of the driving signal applied to mirror 311 should be 180° different from that of the signal applied to mirror 211. In addition, for real-time operation, the frequency of projection should, of course, be the same as the frequency at which the records are recorded, which also requires that mirrors 211 and 311 operate at the same frequency.

Some of the light from each image so displayed passes through beam-splitter 319 and is reflected by aluminized Mylar film 313 of the second varifocal mirror 311 back to the beam-splitter where it is reflected once more to the eyes of a viewer. As indicated above, film 313 forms behind it a two-dimensional image 316' of the two-dimensional image displayed on screen 322; and the image of each such image 316' is observed by looking through beam-splitter 319. Moreover, because vibrating film 313 of mirror 311 has the shape of a portion of a sphere of constantly changing radius, the location of image 316' is constantly changing and consequently the location of the image of image 316' is constantly changing in space.

Simultaneously, however, the images being displayed on screen 322 are being changed; and so, different images are observed at different positions in space. Moreover, because the images that are displayed on screen 322 are a series of related two-dimensional images of the different planes of a three-dimensional object and because the rate of image projection has the same relation to the frequency of oscillation of mirror 311 as the rate of image formation on recording means 225 bears to the frequency of mirror 211, the two-dimensional images of object 216 are properly ordered in space with respect to each other. And consequently, when the images are displayed rapidly enough to be fused by the persistence of vision of the viewer, a three-dimensional image 316 of object 216 can be observed. In addition, because mirrors 211 and 311 are operated 180° out of phase with respect to one another, three-dimensional image 316 is oriented toward the viewer in exactly the same way as object 216 is oriented. And, if the characteristics of certain of the elements of FIG. 2 are as described in the discussion of the magnification problem below, then image 316 will not be distorted.

For a better understanding of the image forming process, it may be helpful to detail the formation and display of two of the two-dimensional images of different planes of image 216'' of object 216. First assume that film 213 of mirror 211 is located at its left pole where it has a convex surface. When film 213 is in this position, image 216' or 216'' is closest to lens 220; and hence it is the image of a plane at the back of image 216'' that is in focus on screen 222. This image is recorded and eventually displayed on screen 322. At the time it is displayed, film 313 of mirror 311, which is operated 180° out of phase with respect to mirror 211, is located at the pole where it has a concave surface. When film 313 is in this position, image 316' is farthest from screen 322; and hence this image is seen to be located at the back of image 316. Similarly, if film 213 is located at its right pole where it has a concave surface, image 216'' is farthest from lens 220; and hence it is the image of a plane at the front of image 216'' that is in focus on screen 222. And when this image is later displayed on screen 322, image 316' is closest to screen 322 because film 313 at this time is located at the pole where it has a convex surface. Consequently, the image plane from the front of image 216'' is displayed at the front of image 316.

As will be obvious to one skilled in the art, numerous modifications can readily be made to my invention. Beam-splitters 219 and 319 are used only for convenience; for it is possible to arrange three-dimensional object 216, varifocal mirror 211, and lens 222 so that light from object 216 is reflected by mirror 211 directly to lens 222. And it is likewise possible for light from display screen 322 to be reflected from mirror 311 directly to the eye of the viewer. The low $f$-number lens that I used in practicing my invention was an F 2.5 305 mm. Aero-Ektar lens; but other lenses are suitable. Similarly, any number of devices for recording and displaying two-dimensional images can be used as means 225 and 325. In my experimentation, I have used an ordinary television system. Numerous other systems, however, could also be used.

The varifocal mirrors that I have used in practicing my invention are 30 centimeter diameter mirrors similar to those described in the literature. Typically, a 15 Hz. sinusoidal signal was used to drive the mirrors; but higher frequencies and different wave shapes can be used. For example, as detailed by Rawson in his papers, a filtered sawtooth wave can be used to provide uniform spacing of the images formed in a varifocal mirror.

For real-time operation of my invention, as detailed above, the number of images displayed per unit time must equal the number of images formed per unit times. And because the ratio of this rate of display to the frequency of oscillation of the varifocal mirror in the display apparatus is the same as the ratio of the rate of image formation to the frequency of oscillation of the varifocal mirror in the image recording apparatus, the frequency of oscillation of both varifocal mirrors must be constant for real-time operation. Where the display rate is different from the image formation rate, however, the mirror frequencies are different because the ratios defined above remain constant.

It also is possible to practice my invention without using varifocal mirrors. Other oscillating reflecting or refracting surfaces that sweep the image of an object through space can, in theory, be used in the practice of my invention. At the present time, however, because of its mechanical simplicity, use of varifocal mirrors seems preferable.

As indicated above, the characteristics of certain of the elements of FIG. 2 determines whether the magnification distorting effects of the varifocal mirrors can be eliminated. Distortion due to transverse magnification (equation 3 above) can be eliminated if the product of the transverse magnification of varifocal mirror 211 and the transverse magnification of varifocal mirror 311 is unity. This condition can be shown to be satisfied if $$F_1 = \frac{\Delta_2}{\Delta_1} M_2 \qquad (4)$$

where $F_1$ is the distance of plane 217 from the origin of mirror 211 as defined in conjunction with FIG. 1; $\Delta_1$ and $\Delta_2$ are the distances between the rest positions and the pole positions of films 213 and 313, respectively; and $M_2$ is the distance from screen 322 to the origin of varifocal mirror 311. Consequently, if the distance $M_2$ from screen 322 to the origin of varifocal mirror 311 in the display system is fixed and if the maximum displacement $\Delta_2$ of film 313 is known, compensation for distortion due to the transverse magnification of the varifocal mirrors can be made in the transmitting apparatus simply by adjusting either or both of the characteristics of lens 220, which determine the distance of plane 217 from the origin of mirror 211, or the characteristics of film 213, which determine the maximum displacement $\Delta_1$ of film 213.

Distortion due to transverse and longitudinal magnification in the system caused by lens 220, recording means 225 and display means 325 is not a problem because the transverse and longitudinal magnifications are equal for the different image positions that can be formed by the varifocal mirrors. It can also be shown that the linear and longitudinal magnifications equal $-\Delta_1/\Delta_2$.

As indicated above, I have used an ordinary television system to record, transit and display 60 different frames or images per second; and I have operated varifocal mirrors 211 and 311 at an oscillation frequency of 15 Hz. As a result, four different depth planes of image 216" were recorded and displayed every one-fifteenth of a second. To display more depth planes, it is possible to use a commercially available television system that can record, transmit and display 180 different frames per second which makes it possible to record and display 12 different depth planes of image 216" every one-fifteenth of a second. For many applications this number of depth planes and this projection rate seems satisfactory.

If, however, even more depth planes are desired with a given television system or movie camera, it is possible to sacrifice vertical resolution for additional depth planes. Illustrative apparatus for this purpose is shown in FIG. 3. The apparatus is similar to that shown in FIG. 2 except for the use of a beam-splitter and two different large aperture low $f$-number lenses to form two two-dimensional images of different planes of the image of three-dimensional object 516. The recording apparatus is comprised of a first varifocal mirror 511, a beam-splitter 518, a mirror 517, a first low $f$-number lens 5201, a second low $f$-number lens 5202, a back projection screen 522 and means 525 for recording whatever is displayed on screen 522. As indicated, such means might be a TV vidicon or movie camera. The system for displaying what is recorded by means 525 is comprised of means 625 for displaying images on screen 622, a mirror 618, a beam-splitter 617 and a second varifocal mirror 611.

The image-forming properties of varifocal mirrors 511 and 611 are similar to those of varifocal mirrors previously described. However, as will become apparent below, the function of the beam-splitters here is different from the function of the beam-splitters in FIG. 2. Lenses 5201 and 5202 both have a large diameter and a small $f$-number so that they both have very short depths of field; and they are used, as lens 220 of FIG. 2 is used, to form on screen 522 substantially two-dimensional images of different planes of the image of object 516. However, the power of lenses 5201 and 5202 and their positions in the recording system are chosen so that when their rear image planes focal are coincident with screen 522 their front conjugate planes are located in space at different points through which the image of object 516 can be moved by operating varifocal mirror 511.

The practice of this embodiment of my invention is similar to the practice of the embodiment shown in FIG. 2. Specifically, a low-frequency signal is first applied to varifocal mirror 511 to drive reflecting film 513. Object 516 is illuminated and some of the light from it is reflected by film 513 to beam-splitter 518. Beam-splitter 518 divides the incident light in half and directs half of it through lens 5202 where it is converged onto one-half of screen 522 while the other half of the light incident on beam-splitter 518 is reflected by mirrors 517 to lens 5201 where it is converged onto the other half of display screen 522. What is displayed on screen 522 is then recorded by recording means 525. However, because the front conjugate planes of lenses 5201 and 5202 are located at different points in space, the images that are in focus on screen 522 and recorded by means 525 are two-dimensional images of different planes of the image of object 516.

Because the shape of film 513 of mirror 511 is constantly changing, the location of the image of object 516 is constantly being swept through space and more particularly through the conjugate planes of lenses 5201 and 5202. Consequently, over a period of time equal to the period of oscillation of film 513, each of the planes of the image of object 516 that is moved through a conjugate plane of lens 5201 or lens 5202 is displayed as a two-dimensional image on one-half of screen 522. And as many possible of these two-dimensional images are recorded by conventional recording means 525 with two images on each frame.

This series of records of two-dimensional images of a three-dimensional object is then used to form a three-dimensional image of the object in a fashion similar to that described in conjunction with FIG. 2. First, a driving signal is applied to varifocal mirror 611 that is 180° out of phase with that applied to varifocal mirror 511. The two-dimensional images are then reconstructed from their records and projected one frame at a time from display means 625 onto a back projection screen 622. Because two images of different planes of the image of object 516 were recorded by means 525 on each frame, two images are projected from each screen onto display screen 622. Light from these two images is reflected by mirror 618 or beam-splitter 617 to reflecting film 613 of mirror 611 and is perceived by the viewer. Consequently, during the projection of one frame, the viewer sees an image of two planes of the image of object 516; and over one period of oscillation of the varifocal mirror 611 he sees all the images that were recorded of the image of object 516.

As indicated above, the price paid for this increase in the number of depth planes recorded is a loss of vertical resolution. Obviously, if the loss of even more vertical resolution can be tolerated, still more beam-splitters and additional lenses can be added the the image forming and display system of FIG. 3.

What is claimed is:

1. Apparatus for recording information about a scene and reconstructing an image thereof comprising:
    a recording means;
    means comprising a lens having a small $f$-number for imaging on the recording means what is situated near a first conjugate plane of the lens;
    oscillating means for forming an image of the scene and for moving said image through the first conjugate plane of the lens to form on the recording means a series of images that are images of different depth planes of the scene; and
    oscillating means for reconstructing the images formed on the recording means at different apparent distances from the point at which the reconstructed images are detected.

2. The apparatus of claim 1 further comprising a display means wherein:
    the oscillating means for forming an image of the scene and for moving said image through the first conjugate focal plane of the lens comprises a first spherical mirror with a variable radius of curvature and
    the oscillating means for reconstructing the images formed on the recording means comprises a second spherical mirror with a variable radius of curvature, said mirror being oriented to reflect light from the display means.

3. The apparatus of claim 2 wherein $$F_1 = \frac{\Delta_2}{\Delta_1} M_2$$

where $F_1$ is the distance between the first conjugate plane of the lens and the center of the first spherical mirror when the mirror is not being oscillated, $\Delta_1$ and $\Delta_2$ are the maximum displacements of first and second spherical mirrors, respectively, from their positions when they are not being oscillated, and $M_2$ is the distance between the display means and the center of the second spherical mirror when the mirror is not being oscillated.

4. The apparatus of claim 2 wherein the frequency of oscillation of the second spherical mirror is approximately 180° out of phase with the frequency of oscillation of the first spherical mirror.

5. The apparatus of claim 1 wherein:
    the oscillating means for forming an image of the scene and for moving said image through the first conjugate plane is a first varifocal mirror and
    the oscillating means for reconstructing the images formed on the recording means comprises a second varifocal mirror.

6. The apparatus of claim 1 wherein:
    the oscillating means for forming an image of the scene and for moving said image through the first conjugate plane of the lens comprises a first movable reflecting or refracting surface and the oscillating means for reconstructing the images formed on the recording means comprises a second movable reflecting or refracting surface.

7. The apparatus of claim 6 wherein:
the first movable surface undergoes oscillatory motion at a first frequency;
the second movable surface undergoes oscillatory motion at a second frequency;
the series of images formed on the recording means are recorded at a first rate;
the images that are reconstructed are reconstructed at a second rate; and
the ratio of the first rate to the first frequency is the same as the ratio of the second rate to the second frequency.

8. The apparatus of claim 6 wherein the transverse and longitudinal magnifications of the apparatus are equal.

9. The apparatus of claim 1 wherein the recording means is a television vidicon or a camera and the means for reconstructing the images formed on the recording means comprises a cathode-ray tube or a projector.

10. The apparatus of claim 1 wherein:
the oscillating means for forming an image of the scene and for moving said image through the first conjugate plane of the lens comprises a first reflecting or refracting means with a variable focal length and
the oscillating means for reconstructing the images formed on the recording means comprises a second reflecting or refracting mean with a variable focal length.

11. Apparatus for recording information about a scene and reconstructing an image thereof comprising:
a recording means;
means comprising a first lens having a small $f$-number for imaging on a first portion of he recording means what is situated near a first conjugate plane of the first lens;
means comprising a second lens having a small $f$-number for imaging on a second portion of the recording means what is situated near a first conjugate plane of the second lens, said first conjugate planes of the first and second lenses being located at different distances from the recording medium;
oscillating means for forming an image of the scene and for giving said image through the first conjugate planes of the first and the second lenses to form on both the first and second portion of the recording means a series of images that are images of different depth planes of the scene; and
oscillating means for reconstructing the images formed on both portions of the recording means at different apparent distances from the point at which the reconstructed images are detected.

12. The apparatus of claim 11 further comprising display means having a first portion on which is formed the series of images formed on the first portion of the recording means and a second portion on which is formed the series of images formed on the second portion of the recording means; and
means for superimposing the images formed on the two portions of the display means, said oscillating means for reconstructing images being oriented to display the superimposed images from the display means.

* * * * *